Aug. 13, 1963  R. G. HOWARD  3,100,662
SUCKER ROD SAFETY JOINT
Filed April 3, 1961
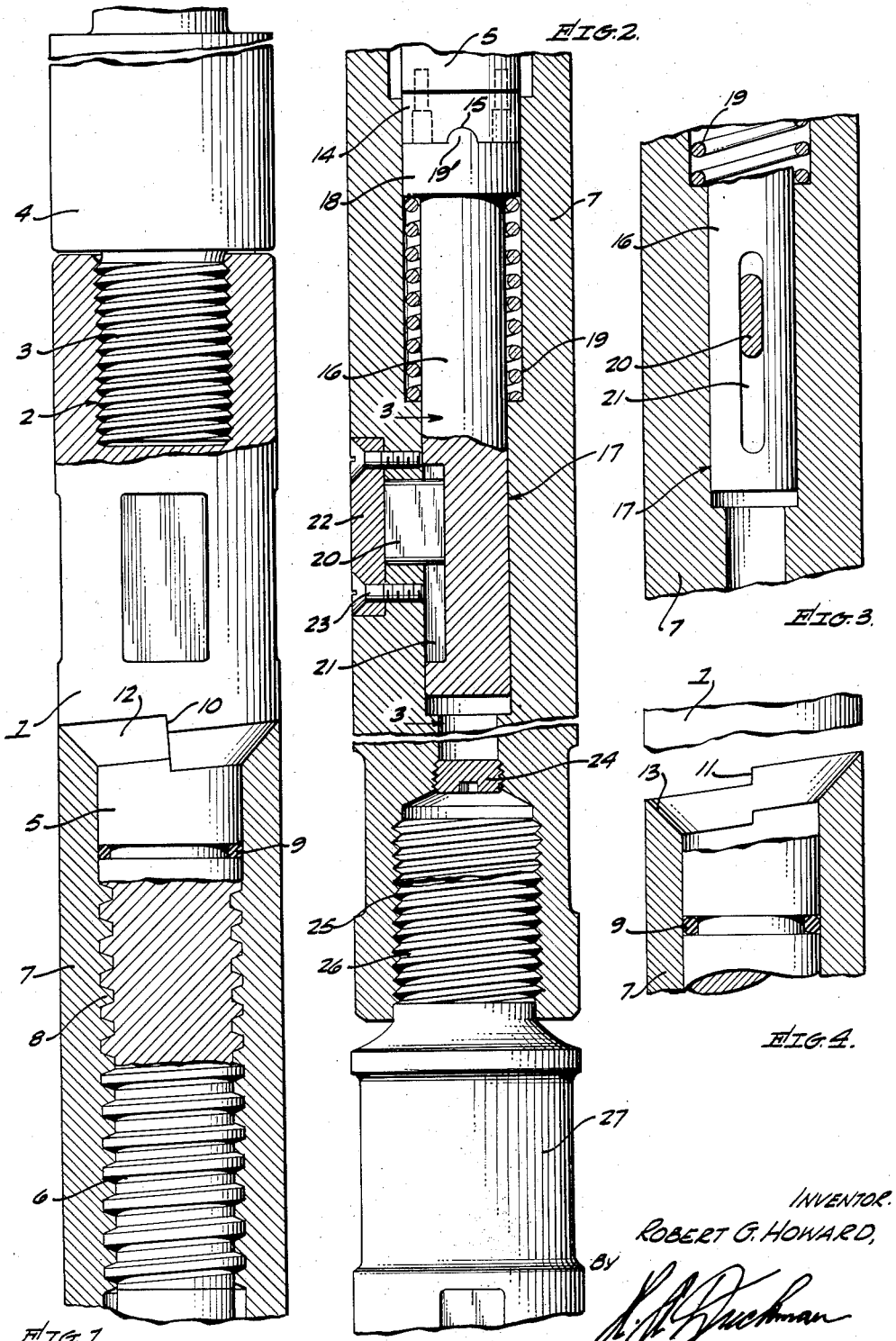
INVENTOR.
ROBERT G. HOWARD,
BY
ATTORNEY.

3,100,662
SUCKER ROD SAFETY JOINT
Robert G. Howard, 16288 Hunter St., Fontana, Calif.
Filed Apr. 3, 1961, Ser. No. 100,184
8 Claims. (Cl. 287—119)

This invention relates to a sucker rod safety joint whereby the sucker rod assembly can be disengaged from the reciprocating element of a deep well pump, if the pump and its reciprocating element should become stuck in the well so that it cannot be readily pulled upwardly, nor can the reciprocating element be rotated or moved longitudinally.

An object of my invention is to provide a novel sucker rod safety joint which is positioned between the lowermost sucker rod and the reciprocating unit of a deep well pump, this safety joint including a coarse threaded unit which can be unscrewed when necessary to uncouple the sucker rod string from the pump.

Another object of my invention is to provide a novel safety joint of the character stated, in which the threaded portion of the safety joint is held against accidental unscrewing during normal operation of the pump and sucker rods.

Another object of my invention is to provide a novel safety joint of the character stated, in which the inner releasing portion of the safety joint is sealed against intrusion of water, sand, and the like.

Still another object of my invention is to provide a novel safety joint of the character stated, in which a spring loaded latch is incorporated within the releasing element of the safety joint, this spring loaded latch yieldably engaging the threaded portion of the safety joint to prevent accidental unscrewing of this portion of the safety joint.

Still another object of my invention is to provide a novel safety joint which can be readily mounted between the deep well pump and the lowermost sucker rod, and which will readily fit in the tubing through which the pump itself moves.

Other objects, advantages and features of invention may appear from the accompanying drawing, the subjoined detailed description and the appended claims.

In the drawing:

FIGURE 1 is a vertical view partly in elevation and partly in section of the upper portion of my sucker rod safety joint.

FIGURE 2 is a fragmentary vertical view partly in elevation and partly in section showing the lower portion of my sucker rod safety joint.

FIGURE 3 is a fragmentary sectional view taken on line 3—3 of FIGURE 2.

FIGURE 4 is a fragmentary vertical sectional view of the stop shoulder on the upper end of the sleeve.

Referring more particularly to the drawing, my sucker rod safety joint consists of a head 1, in the upper end of which a threaded box 2 is formed. The threaded box 2 receives a threaded pin 3 on the lower end of the lowermost sucker rod 4, which extends into the well flow tubing (not shown), and these sucker rods extend from the surface of the ground to the pump at the bottom of the well. The head 1 is formed with an integral shaft 5, which is either fixedly secured to the head 1, or may be an integral part of that head. The shaft 5 is of smaller diameter than the head 1 and coarse external threads 6 are cut on the shaft. The threads 6 are coarse and quite flat in pitch, and may be of the type known as acme threads. The shaft 5 extends into a sleeve 7 and the outside diameter of this sleeve is about the same as the outside diameter of the head 1. Matching threads 8 are cut on the inside of the sleeve 7 and the threads 6 screw into the threads 8 when the parts are assembled for introduction to the oil well. The threads 8 are spaced somewhat below the upper end of the sleeve 7 to accommodate the smooth upper end of the shaft 5. The purpose of this smooth upper end of the shaft 5 is to accommodate an O-ring 9 on the shaft which seals the upper end of the sleeve 7 and prevents sand, water, etc., from entering the sleeve and clogging and corroding the threads 6 and 8. When the threads 6 are screwed into the complementary threads 8 it is important that these threads should not seat, bind, or be too tight, and to prevent these threads from making up too tightly, I provide a stop shoulder 10 on the lower end of the head 1, and a matching stop shoulder 11 on the upper end of the sleeve 7. The shoulders 10—11 engage when the tool is entirely made up, that is, when the shaft 5 is entirely within the sleeve 7, thus acting as a stop to prevent excessive tightening of the threads 6 and 8. The complementary surfaces 12 on the bottom of the head 1, and 13 on the top of the sleeve 7 are inclined at about the same angle as the threads 6, thus permitting the shoulders 10—11 to engage as the shaft 5 screws into the sleeve 7.

A lock plate 14 is removably mounted on the bottom of the shaft 5 and is formed with a transversely extending recess or groove 15, which is semicircular in cross section. The purpose of this groove, termed a latch groove, will be subsequently described.

A piston rod 16 is reciprocally mounted in the bore 17 of the sleeve 7, and a piston 18 is formed on the upper end of the piston rod 16. A spring 19 bears against the piston 18 and urges the piston and the rod 16 upwardly. The piston 18 is formed with a diametrical key 19' which fits in the groove 15, acting as a latch to prevent accidental rotation of the shaft 5 and the head 1 with relation to the sleeve 7. To prevent rotation of the piston rod 16 within the sleeve 7, a key 20 extends inwardly from the sleeve 7 into a keyslot 21 in the piston rod 16. The key 20 is held in operative position within the sleeve 7 by a removable plate 22 which is held in the sleeve 7 by the machine screws 23. To seal off the lower end of the bore 17, I provide a threaded plug 24 which screws into the lower end of the bore 17 and prevents sand, water, and the like from entering the lower end of the bore and contaminating the working parts within the sleeve 7. The lower end of the sleeve 7 is formed with a threaded box 25, which receives the threaded pin 26 of the reciprocating member of the pump 27, which reciprocating member may be either a traveling plug or a traveling barrel.

My sucker rod safety joint is thus positioned between the lowermost sucker rod 4 and the traveling member of the pump, such as the plunger 27. If the pump and/or the plunger becomes stuck in the well and cannot be removed by pulling upwardly on the sucker rods alone, the sucker rods can be removed by rotating the same at the surface, which will unscrew the shaft 5 from the sleeve 7. The latch elements 15 and 19' will cause a slight hindrance to the free rotation of the shaft 5 for approximately six or seven turns, after which the shaft 5 will freely rotate and the threaded portion thereof will unscrew from the sleeve 7, thus permitting the entire sucker rod stands to be removed from the well. A heavier jar or other pulling mechanism can then be inserted into the well, threaded into the sleeve 7 and into the threads 8 thereof to finally remove the pump, as well as its reciprocating member, such as the plunger 27. While the sucker rod safety joint is in the well the inner working parts thereof, such as the shaft 5, the threads 6 and 8, the piston rod 16 are all sealed against intrusion of sand, water and the like so that these parts will all work freely when required. Due to the semicircular shape of the recess 15 and the key 19 these parts will permit unscrewing of the shaft 5, merely presenting a slight resistance so that the shaft 5 will not accidentally unscrew during normal operation of the pump.

Having described my invention, I claim:

1. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a threaded box in one end of said sleeve to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts.

2. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a threaded box in one end of said sleeve to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts, and a spring engaging the piston rod to urge the key into the recess.

3. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a threaded box in one end of said sleeve to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts, and pack-off means at both ends of said bore to exclude deleterious material from within the sleeve.

4. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts, and a spring engaging the piston rod to urge the key into the recess, and pack-off means at both ends of said bore to exclude deleterious material from within the sleeve.

5. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a shoulder on the upper end of the sleeve, a shoulder on the lower end of said head, both of said shoulders engaging in one position of the parts to limit the threading engagement of the sleeve and the shaft, a threaded box in one end of said sleeve to receive the threaded end of a reciprocating element of a pump, and releasable latch means engaging said shaft to hold said shaft against accidental rotation in said sleeve.

6. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a shoulder on the upper end of the sleeve, a shoulder on the lower end of said head, both of said shoulders engaging in one position of the parts to limit the threading engagement of the sleeve and the shaft, a threaded box in one end of said sleeve to receive the threaded end of a reciprocating element of a pump, and releasable latch means engaging said shaft to hold said shaft against accidental rotation in said sleeve, and pack-off means at both ends of said bore to exclude deleterious material from within the sleeve.

7. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a shoulder on the upper end of the sleeve, a shoulder on the lower end of said head, both of said shoulders engaging in one position of the parts to limit the threading engagement of the sleeve and the shaft, a threaded box on one end of said sleeve to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts.

8. A sucker rod safety joint adapted to be mounted between a sucker rod and the reciprocating element of a pump, comprising a head, said head having a threaded box in one end thereof to receive the threaded pin of a sucker rod, a threaded shaft depending from said head, a sleeve, said sleeve having a bore extending longitudinally therethrough, said bore being threaded to receive the threaded shaft, a shoulder on the upper end of the sleeve, a shoulder on the lower end of said head, both of said shoulders engaging in one position of the parts to limit the threading engagement of the sleeve and the shaft, a threaded box on one end of said sleeve to receive the threaded end of a reciprocating element of a pump, a piston rod reciprocally and nonrotatably mounted in the bore of the sleeve, said shaft having a recess in the bottom thereof, and a key on the piston rod fitting into said recess in one position of the parts, and pack-off means at both ends of said bore to exclude deleterious material from within the sleeve.

References Cited in the file of this patent

UNITED STATES PATENTS

| Number | Name | Date |
| --- | --- | --- |
| 1,559,874 | Holland | Nov. 3, 1925 |
| 1,681,699 | Coates | Aug. 21, 1928 |
| 2,049,289 | Burns et al. | July 28, 1936 |
| 2,049,290 | Burns et al. | July 28, 1936 |